United States Patent
Kanodia et al.

(10) Patent No.: US 8,724,468 B2
(45) Date of Patent: *May 13, 2014

(54) BONDING MULTIPLE RADIOS IN WIRELESS MULTI-HOP MESH NETWORKS

(75) Inventors: Sachin Kanodia, San Jose, CA (US); Mohan Natarajan, San Ramon, CA (US); Jorjeta Gueorguieva Jetcheva, Los Gatos, CA (US)

(73) Assignee: Firetide, Inc., Campbell, CA (US)

( * ) Notice: Subject to any disclaimer, the term of this patent is extended or adjusted under 35 U.S.C. 154(b) by 104 days.

This patent is subject to a terminal disclaimer.

(21) Appl. No.: 13/168,988

(22) Filed: Jun. 26, 2011

(65) Prior Publication Data

US 2012/0134326 A1    May 31, 2012

Related U.S. Application Data

(63) Continuation of application No. PCT/US2007/078951, filed on Sep. 19, 2007, which is a continuation of application No. 12/404,170, filed on Mar. 13, 2009, now Pat. No. 7,969,942.

(60) Provisional application No. 60/826,153, filed on Sep. 19, 2006.

(51) Int. Cl.
*G08C 15/00*    (2006.01)

(52) U.S. Cl.
USPC ............................................ 370/235; 370/230

(58) Field of Classification Search
USPC .................. 370/230, 235, 252, 400, 392, 412
See application file for complete search history.

(56) References Cited

U.S. PATENT DOCUMENTS

| | | | |
|---|---|---|---|
| 6,385,201 B1 * | 5/2002 | Iwata | 370/400 |
| 7,366,120 B2 * | 4/2008 | Handforth et al. | 370/310 |
| 7,613,110 B1 * | 11/2009 | Blair | 370/230 |

* cited by examiner

*Primary Examiner* — Chandrahas Patel
(74) *Attorney, Agent, or Firm* — PatentVentures:; Bennett Smith; Korbin Van Dyke

(57) ABSTRACT

In a mesh network composed of multiple-radio nodes, we assign each radio to one of a plurality of channels, and treat a plurality of links between a pair of nodes as one logical link (bonded link). In some embodiments, the routing protocol is adapted to view each bonded link as one link having a combination of at least some of the properties of the constituent physical links. Traffic sent along a path is dynamically load balanced between the interfaces at each intermediate node based on the current utilization of each interface. In at least some embodiments, route discovery packets record the metrics of each component link of the bonded links leaving a node, but only one route discovery packet per pair of nodes is forwarded, reducing the route discovery packet traffic compared to if each route discovery packet were forwarded over each component link between the pair of nodes.

13 Claims, 1 Drawing Sheet

BONDING MULTIPLE RADIOS IN WIRELESS MULTI-HOP MESH NETWORKS

CROSS REFERENCE TO RELATED APPLICATIONS

Priority benefit claims for this application are made in the accompanying Application Data Sheet, Request, or Transmittal (as appropriate, if any). To the extent permitted by the type of the instant application, this application incorporates by reference for all purposes the following applications, all owned by the owner of the instant application:

U.S. application Ser. No. 12/404,170, filed Mar. 13, 2009, and now U.S. Pat. No. 7,969,942, first named inventor Sachin Kanodia, and entitled BONDING MULTIPLE RADIOS IN WIRELESS MULTI-HOP MESH NETWORKS;

U.S. PCT Application Serial No. PCT/US2007/078951, filed Sep. 19, 2007, first named inventor Sachin Kanodia, and entitled BONDING MULTIPLE RADIOS IN WIRELESS MULTI-HOP MESH NETWORKS; and U.S. Provisional Application Ser. No. 60/826,153, filed Sep. 19, 2006, first named inventor Sachin Kanodia, and entitled BONDING MULTIPLE RADIOS IN WIRELESS MULTI-HOP MESH NETWORKS.

BACKGROUND

1. Field

Advancements in multi-radio mesh networks are needed to provide improvements in performance, efficiency, and utility of use.

2. Related Art

Unless expressly identified as being publicly or well known, mention herein of techniques and concepts, including for context, definitions, or comparison purposes, should not be construed as an admission that such techniques and concepts are previously publicly known or otherwise part of the prior art. All references cited herein (if any), including patents, patent applications, and publications, are hereby incorporated by reference in their entireties, whether specifically incorporated or not, for all purposes.

Multi-radio mesh networks have a higher potential traffic carrying capacity than single radio networks. Each wireless interface (or radio) of a mesh node is selectively tunable to a different channel and is selectively usable in parallel with the other wireless interfaces of the node. In an ideal scenario, a node with N wireless interfaces has N times the capacity of a node with a single wireless interface. Of course in non-idealized implementations, when more than one node is involved, the capacity does not scale exactly as in the ideal scenario because, for example, the resulting capacity also depends on environmental conditions.

SYNOPSIS

The invention may be implemented in numerous ways, including as a process, an article of manufacture, an apparatus, a system, a composition of matter, and a computer readable medium such as a computer readable storage medium or a computer network wherein program instructions are sent over optical or electronic communication links. In this specification, these implementations, or any other form that the invention may take, may be referred to as techniques. In general, the order of the operations of disclosed processes may be altered within the scope of the invention. The Detailed Description provides an exposition of one or more embodiments of the invention that enable improvements in performance, efficiency, and utility of use in the field identified above. The Detailed Description includes an Introduction to facilitate the more rapid understanding of the remainder of the Detailed Description. The Introduction includes Illustrative Combinations that tersely summarize illustrative systems and methods in accordance with the concepts taught herein. As is discussed in more detail in the Conclusions, the invention encompasses all possible modifications and variations within the scope of the issued claims.

BRIEF DESCRIPTION OF DRAWINGS

FIG. 1 illustrates radio bonding between a plurality of nodes.

DETAILED DESCRIPTION

A detailed description of one or more embodiments of the invention is provided below along with accompanying figures that illustrate the principles of the invention. The invention is described in connection with the embodiments. It is well established that it is neither necessary, practical, or possible to exhaustively describe every embodiment of the invention. Thus the embodiments herein are understood to be merely illustrative, the invention is expressly not limited to or by any or all of the embodiments herein, and the invention encompasses numerous alternatives, modifications and equivalents. To avoid monotony in the exposition, a variety of word labels (including but not limited to: first, last, certain, particular, select, and notable) may be applied to separate sets of embodiments; as used herein such labels are expressly not meant to convey quality, or any form of preference or prejudice, but merely to conveniently distinguish among the separate sets. Wherever multiple embodiments serve to illustrate variations in process, method, and/or program instruction features, other implementations are contemplated that in accordance with a predetermined or a dynamically determined criterion perform static and/or dynamic selection of one of a plurality of modes of operation corresponding respectively to a plurality of the multiple embodiments. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Introduction

This introduction is included only to facilitate the more rapid understanding of the Detailed Description; the invention is not limited to the concepts presented in the introduction (including explicit examples, if any), as the paragraphs of any introduction are necessarily an abridged view of the entire subject and are not meant to be an exhaustive or restrictive description. For example, the introduction that follows provides overview information limited by space and organization to only certain embodiments. There are many other embodiments, including those to which claims will ultimately be drawn, discussed throughout the balance of the specification.

In the context of a mesh network composed of nodes having multiple radios, we selectively assign each radio to one of a plurality of channels, and treat the links between a pair of nodes as one logical link (bonded link). We call this logical grouping of wireless links radio bonding. Traffic sent along a path is selectively dynamically load balanced between the interfaces at each intermediate node based on the current utilization of each interface. A particular subset of these multiple radio embodiments are two-radio embodiments having two links between node pairs.

In at least some embodiments, the routing protocol is adapted to view each bonded link as one link having a combination of at least a selected subset of the properties of the physical links; the selected subset of the properties including at least one of: capacity, lossyness, and signal strength. In at least some other embodiments, for each bonded link, the routing protocol is provided information on the associated multiple underlying physical links and their individual properties. In accordance with predetermined criteria, the routing protocol selectively chooses to treat each bonded link as one logical link or to use the individual physical links. The choice may be based on factors including, but not limited to: the size of a node's route cache, its computing ability, and the number of channels used in the network. Such factors may vary over time and in a further subset of embodiments the routing protocols treatment of each bonded link (as one logical link or as individual links) also selectively varies over time.

Example Combinations

In concluding the introduction to the detailed description, what follows is a collection of illustrative embodiments, including at least some explicitly enumerated as "ECs" (Example Combinations), providing supplementary description in a somewhat informal and terse format to highlight a variety of embodiment types in accordance with the concepts taught herein; these examples are not meant to be mutually exclusive, exhaustive, or restrictive; and the invention is not limited to these highlighted embodiments but rather encompasses all possible modifications and variations within the scope of the issued claims.

EC1) A method of traffic management in a mesh network having a plurality of nodes each having multiple radio interfaces, the method comprising:

Between at least one pair of the nodes, establishing a respective collection of individual links, each link having a respective channel assignment;

Managing at least one of the collection of links as a corresponding single logical link having the capacity of the sum of the individual links of the collection; and For at least one of the logical links, dynamically load balancing traffic across the individual links of the corresponding collection.

EC2) The method of EC1, further including:

for each logical link being dynamically load balanced, balancing the load at least in part based on the current utilization of each link of the corresponding collection.

EC3) The method of EC2, further including:

identifying particular flows within each of one or more classes of traffic flows; and for each logical link being dynamically load balanced, balancing the load such that all traffic corresponding to a particular identified flow is steered over a respective selected one of the individual links.

EC4) The method of EC3, further including:

Defining one of the classes as corresponding to sets of application related flows distinguished by the combination of their source IP address and destination IP address.

EC5) The method of EC3, further including:

Defining one of the classes as corresponding to application related flows distinguished by the combination of their source IP address, destination IP address, source port, and destination port.

EC6) The method of EC3, further including:

at the node where each particular identified flow first enters the mesh network, assigning the particular identified flow with a corresponding flow ID based on a selected one of the classes of traffic flows; and implementing the steering of each traffic flow based on its corresponding flow ID.

EC7) The method of EC1, further including:

generating route discovery packets in accordance with a predetermined criteria; and forwarding only one instance of each route discovery packet between each pair of nodes having a logical link.

EC8) The method of EC1, wherein each node has 2 radios per logical link.

EC9) The method of EC1, wherein at least some nodes have more than 2 radios available but allocate at most 2 radios per logical link.

EC10) The method of EC1, wherein the managing of the individual links as a single logical link is performed selectively.

EC11) The method of EC1, wherein the managing of the individual links as a single logical link is performed always.

EC12) A computer readable medium having a set of instructions stored therein which when executed by a processing device causes the processing device to perform traffic management procedures in a mesh network having a plurality of nodes each having multiple radio interfaces, the procedures comprising:

between at least one pair of the nodes, establishing a respective collection of individual links, each link having a respective channel assignment;

managing at least one of the collection of links as a corresponding single logical link having the capacity of the sum of the individual links of the collection; and for at least one of the logical links, dynamically load balancing traffic across the individual links of the corresponding collection.

EC13) The computer readable medium of EC12, the procedures further including:

for each logical link being dynamically load balanced, balancing the load at least in part based on the current utilization of each link of the corresponding collection.

EC14) The computer readable medium of EC13, the procedures further including:

identifying particular flows within each of one or more classes of traffic flows; and for each logical link being dynamically load balanced, balancing the load such that all traffic corresponding to a particular identified flow is steered over a respective selected one of the individual links.

EC15) The computer readable medium of EC14, the procedures further including:

defining one of the classes as corresponding to sets of application related flows distinguished by the combination of their source IP address and destination IP address.

EC16) The computer readable medium of EC14, the procedures further including:
defining one of the classes as corresponding to application related flows distinguished by the combination of their source IP address, destination IP address, source port, and destination port.

EC17) The computer readable medium of EC14, the procedures further including:
at the node where each particular identified flow first enters the mesh network, assigning the particular identified flow with a corresponding flow ID based on a selected one of the classes of traffic flows; and
implementing the steering of each traffic flow based on its corresponding flow ID.

EC18) The computer readable medium of EC12, the procedures further including:
generating route discovery packets in accordance with a predetermined criteria; and
forwarding only one instance of each route discovery packet between each pair of nodes having a logical link.

EC19) A multiple-radio node used in a mesh network having a plurality of instances of the node, each multiple-radio node comprising:
a plurality of radio interfaces;
means for establishing a respective collection of individual links with at least one other of the multiple-radio node instances, each link having a respective channel assignment;
means for managing at least one of the collection of links as a corresponding single logical link having the capacity of the sum of the individual links of the collection; and
means for dynamically load balancing traffic across the individual links of the corresponding collection, for at least one of the logical links.

EC20) The multiple-radio node of EC19, further including:
means for balancing the load for each logical link being dynamically load balanced, the balancing being at least in part based on the current utilization of each link of the corresponding collection.

EC21) The multiple-radio node of EC20, further including:
means for identifying particular flows within each of one or more classes of traffic flows; and
means for balancing the load for each logical link being dynamically load balanced, the balancing being such that all traffic corresponding to a particular identified flow is steered over a respective selected one of the individual links.

EC22) The multiple-radio node of EC21, further including:
means for defining one of the classes as corresponding to sets of application related flows distinguished by the combination of their source IP address and destination IP address.

EC23) The multiple-radio node of EC21, further including:
means for defining one of the classes as corresponding to application related flows distinguished by the combination of their source IP address, destination IP address, source port, and destination port.

EC24) The multiple-radio node of EC21, further including:
means for ascertaining if a particular identified flow first entered the mesh network through the instant node, and when positively ascertained, assigning the particular identified flow with a corresponding flow ID based on a selected one of the classes of traffic flows; and
means for implementing the steering of each traffic flow based on its corresponding flow ID.

EC25) The multiple-radio node of EC19, further including:
means for generating route discovery packets and forwarding only one instance of each route discovery packet between each pair of nodes having a logical link.

Particular Embodiments

To avoid reordering of packets, it is best to not split traffic that belongs to the same application-level flow (e.g., identified by the quadruple: source IP address, destination IP address, source port, destination port) among links or paths. Maintaining flow information is selectively achieved by designating forwarding flows at the node at which traffic first enters the network, e.g., by associating an ID with each application flow, or set of application-level flows, e.g., all the ones between a source and destination node pair. Then each flow is selectively assigned to an interface dynamically at each intermediate node based on the link utilization of the link between the node and its next hop neighbor.

An optimization that is very useful in the context of bonded links is reducing the forwarding of broadcast route discovery packets. Broadcast route discovery packets are sent by a source mesh node and are forwarded by each node on each of its interfaces if they contain a route (e.g., a list of hops traversed so far) that is different from previously seen routes and has the same or better metric to the paths contained in previous copies of the route discovery packet. In the case of bonding this kind of forwarding would generate a lot more broadcast transmissions than in a non-bonded network. In particular, in the example above, as illustrated by FIG. 1, assuming that all links have the same metrics, that would mean that A would send 2 copies of a broadcast packet, B will forward the 2 copies along each of its two interfaces, which now causes 4 transmissions exiting from B, which would be doubled at C, etc. When there is a single physical link between every pair of nodes, only a single copy of the broadcast route discovery would traverse the path from A to D in the example above.

To resolve this problem, while enabling the discovery of all traversed links, in at least some embodiments the route discovery packet records (conveys via embedded coding) the metrics of all physical links leaving a node, and only one copy of it per pair of nodes should be forwarded on. For example, node A in the FIGURE above would broadcast the packet on both of its interfaces including the link metrics on both of its interfaces, but node B would only forward one copy of the packet along each of its interfaces, which would contain the link metrics for both physical links between A and B.

Extensions to the above include networks where only some of the links are bonded, and where some nodes may have more than 2 radios available to use per bonded link but only 2 of their radios are bonded.

CONCLUSION

There are many ways of implementing the invention. It is well established that it is neither necessary, practical, or possible to exhaustively describe every embodiment of the invention. Thus the foregoing embodiments are understood to be merely illustrative, the invention is expressly not limited to or by any or all of the embodiments herein, and the invention encompasses numerous alternatives, modifications and equivalents.

Many variations in construction, arrangement and use are contemplated consistent with the teachings and within the scope of the claims of the issued patent. For example, the degree of parallelism or instantiation (i.e., the dimension, number, or width) of interconnect and function-units, clock speeds, and the type of technology used may generally be varied in each component block. The names given to interconnect and logic are merely illustrative, and should not be construed as limiting the concepts taught. The order and arrangement of flowchart and flow diagram process, action, and function elements may generally be varied. Also, unless specifically stated to the contrary, the value ranges specified, the maximum and minimum values used, or other particular specifications, are merely those of the illustrative embodiments, may be expected to track improvements and changes in implementation technology, and should not be construed as limitations.

Functionally equivalent techniques known to those of ordinary skill in the art may be employed instead of those illustrated to implement various components, sub-systems, functions, operations, routines, and sub-routines. It is also understood that many design functional aspects may be carried out in either hardware (i.e., generally dedicated circuitry) or software (i.e., via some manner of programmed controller or processor), as a function of implementation dependent design constraints and the technology trends of faster processing (facilitating migration of functions previously in hardware into software) and higher integration density (facilitating migration of functions previously in software into hardware).

Example variations may include, but are not limited to: differences in partitioning; different form factors and configurations; use of different operating systems and other system software; use of different interface standards, network protocols, or communication links; and other variations to be expected when implementing the concepts taught herein in accordance with the unique engineering and business constraints of a particular application. Wherever multiple embodiments serve to illustrate variations in process, method, and/or program instruction features, other implementations are contemplated that in accordance with a predetermined or a dynamically determined criterion perform static and/or dynamic selection of one of a plurality of modes of operation corresponding respectively to a plurality of the multiple embodiments.

To provide a thorough understanding the embodiments have been illustrated with detail and environmental context well beyond that required for a minimal implementation of many of aspects of the concepts taught. Variations may omit disclosed components or features without altering the basic cooperation among the remaining elements. Thus the invention may be practiced according to the claims without some or all of these specific details. To the extent that the remaining elements are distinguishable from the prior art, components and features that may be so omitted are not limiting on the concepts taught herein. For the purpose of clarity, technical material that is known in the technical fields related to the invention has not been described in detail so that the invention is not unnecessarily obscured.

Certain choices have been made in the presentation of this disclosure merely for reasons of convenience in preparing the text and drawings. Unless there is an indication to the contrary these choices of convenience should not be construed per se as conveying additional or implicit information regarding the structure or quality of the embodiments illustrated. Illustrative examples of such choices of convenience include: the particular organization or assignment of the designations used for the FIGURE numbering and the particular organization or assignment of the element identifiers (i.e., the callouts or numerical designators) used to identify and reference the features and elements of the embodiments. To avoid monotony in the exposition, a variety of word labels (including but not limited to: first, last, certain, particular, select, and notable) may be applied to separate sets of embodiments; as used herein such labels are expressly not meant to convey quality, or any form of preference or prejudice, but merely to conveniently distinguish among the separate sets.

All such variations in design comprise insubstantial changes over the teachings conveyed by the illustrative embodiments. It is also understood that the concepts taught herein have broad applicability to other computing and networking applications, and are not limited to the particular application or industry of the illustrated embodiments. The invention is thus to be construed as including all possible modifications and variations encompassed within the scope of the claims.

What is claimed is:

1. A method of traffic management in a mesh network having a plurality of nodes each having multiple radio interfaces, the method comprising:
   between at least one pair of the nodes, establishing a respective collection of individual links, each link having a respective channel assignment;
   managing at least one of the collection of links as a corresponding single logical link having the capacity of the sum of the individual links of the collection;
   for at least one of the logical links, dynamically load balancing traffic across the individual links of the corresponding collection;
   identifying particular flows within each of one or more classes of traffic flows;
   for each logical link being dynamically load balanced, balancing the load such that all traffic corresponding to a particular identified flow is steered over a respective selected one of the individual links;
   at the node where each particular identified flow first enters the mesh network, assigning the particular identified flow with a corresponding flow ID based on a selected one of the classes of traffic flows; and
   implementing the steering of each traffic flow based on its corresponding flow ID.

2. The method of claim 1, wherein the managing of the individual links as a single logical link is performed always.

3. The method of claim 1, further including:
   defining one of the classes as corresponding to sets of application related flows distinguished by the combination of their source IP address and destination IP address.

4. The method of claim 1, further including:
   defining one of the classes as corresponding to application related flows distinguished by the combination of their source IP address, destination IP address, source port, and destination port.

5. The method of claim 1, wherein each node has 2 radios per logical link.

6. The method of claim 1, wherein at least some nodes have more than 2 radios available but allocate at most 2 radios per logical link.

7. The method of claim 1, wherein the managing of the individual links as a single logical link is performed selectively.

8. A non-transitory computer readable medium having a set of instructions stored therein which when executed by a processing device causes the processing device to perform traffic management procedures in a mesh network having a plurality of nodes each having multiple radio interfaces, the procedures comprising:

between at least one pair of the nodes, establishing a respective collection of individual links, each link having a respective channel assignment;

managing at least one of the collection of links as a corresponding single logical link having the capacity of the sum of the individual links of the collection;

for at least one of the logical links, dynamically load balancing traffic across the individual links of the corresponding collection;

identifying particular flows within each of one or more classes of traffic flows;

for each logical link being dynamically load balanced, balancing the load such that all traffic corresponding to a particular identified flow is steered over a respective selected one of the individual links;

at the node where each particular identified flow first enters the mesh network, assigning the particular identified flow with a corresponding flow ID based on a selected one of the classes of traffic flows; and implementing the steering of each traffic flow based on its corresponding flow ID.

9. The non-transitory computer readable medium of claim 8, the procedures further including:

defining one of the classes as corresponding to application related flows distinguished by the combination of their source IP address, destination IP address, source port, and destination port.

10. The non-transitory computer readable medium of claim 8, the procedures further including:

defining one of the classes as corresponding to sets of application related flows distinguished by the combination of their source IP address and destination IP address.

11. A multiple-radio node used in a mesh network having a plurality of instances of the node, each multiple-radio node comprising:

a plurality of radio interfaces;

means for establishing a respective collection of individual links with at least one other of the multiple-radio node instances, each link having a respective channel assignment;

means for managing at least one of the collection of links as a corresponding single logical link having the capacity of the sum of the individual links of the collection;

means for dynamically load balancing traffic across the individual links of the corresponding collection, for at least one of the logical links;

means for identifying particular flows within each of one or more classes of traffic flows;

means for balancing the load for each logical link being dynamically load balanced, the balancing being such that all traffic corresponding to a particular identified flow is steered over a respective selected one of the individual links; and means for ascertaining if a particular identified flow first entered the mesh network through the instant node, and when positively ascertained, assigning the particular identified flow with a corresponding flow ID based on a selected one of the classes of traffic flows; means for implementing the steering of each traffic flow based on its corresponding flow ID.

12. The multiple-radio node of claim 11, further including:

means for defining one of the classes as corresponding to application related flows distinguished by the combination of their source IP address, destination IP address, source port, and destination port.

13. The multiple-radio node of claim 11, further including:

means for defining one of the classes as corresponding to sets of application related flows distinguished by the combination of their source IP address and destination IP address.

* * * * *